UNITED STATES PATENT OFFICE.

SAMUEL E. ALLEN, OF AKRON, OHIO, ASSIGNOR TO THE EMPIRE RUBBER COMPANY, A CORPORATION OF OHIO.

PROCESS OF DEVULCANIZING RUBBER.

1,178,483. Specification of Letters Patent. Patented Apr. 11, 1916.

No Drawing. Application filed December 7, 1911, Serial No. 664,372. Renewed December 22, 1914. Serial No. 878,609.

*To all whom it may concern:*

Be it known that I, SAMUEL E. ALLEN, of Akron, county of Summit, and State of Ohio, a citizen of the United States, have invented new and useful Improvements in the Process of Devulcanizing Rubber, of which the following is a specification.

This invention consists in a new and improved process for devulcanizing rubber producing a new and improved product. Two discoveries are involved in this process: First, the discovery that a certain kind of oil has the capability of devulcanizing rubber and, not only so, but even to an unprecedented degree of efficiency. Second, the discovery that this may be availed of on vulcanized goods containing fiber, with the concurrent action of a fiber destroying agent in a single operation.

The oil employed in my process is a distillate of pine wood having a specific gravity between that of oil of turpentine and that of resin oil; in other words, between about .88 and .96 at 15° C. More specifically, the oil that I have employed is about from .93 to .95 specific gravity and may be obtained as a distillate from the stumps of long leaf pine trees (*Pinus palustris*) by distilling according to the well known resin or other bath process, in which the bath has a higher boiling point than the distilling temperature of the oil and subsequent redistillation. This oil is to be found on the market and may be further identified by the fact that the greater part of its bulk in a dry still will distil over at a temperature between about 200 and 220 C. The preferable specific gravity is from .935 to .945 at 15 C.

In devulcanizing rubber containing no fiber, known in the trade as pure gum stock, I proceed as follows: The rubber is ground so as to pass through a screen of 3 to 5 mesh per inch and placed in a mixing tank. Water is added sufficient to just submerge the rubber. The said oil is distributed over the surface and mixed either by hand or machinery. The proportions are about as follows: 200 lbs. pure gum stock, 600 lbs. water, 17 lbs. said oil. The mass is dumped into a covered devulcanizing tank which is run into a devulcanizing oven where it is inclosed so as to maintain pressure and where it is allowed to remain for about 15 hours at a temperature and pressure corresponding with about 100 lbs. steam pressure (327 F.) applied either by admitting the steam into a surrounding steam jacket or directly into the devulcanizing oven. The mass is then removed from the tank and batched in a washer and dried.

In devulcanizing rubber containing cotton fiber such as old automobile tires, I proceed as follows: The rubber is ground so as to pass through a screen of 3 to 5 mesh per inch and placed in a covered mixing tank. A solution of sulfuric acid in proportions as below is added. The said oil is distributed over the surface and mixed by machinery or hand. The remainder of the process is the same as with the pure gum stock. The proportions are as follows: 200 lbs. ground tires, 800 lbs. water, 2 gallons sulfuric acid, 3 gallons said oil.

In devulcanizing rubber containing more or less wool fiber mixed with the cotton, such as old rubber boots and shoes, I proceed as follows: The rubber is ground so as to pass through a screen of 3 to 5 mesh per inch and placed in a covered mixing tank submerged with a 2% solution of sulfuric acid and allowed to stand for 12 hours at ordinary temperature. The said oil is then distributed over the surface and mixed. Then more sulfuric acid is added. The remainder of the process is as before. The proportions are as follows: 200 lbs. ground boots and shoes, 600 lbs. water acidulated with 2% sulfuric acid, 2 gallons sulfuric acid, 3 gallons said oil.

Instead of a devulcanizing tank in a stationary devulcanizer, a double jacketed revolving devulcanizer may be employed with the heat and pressure above specified.

I do not limit myself to sulfuric acid as the fiber removing agent, equivalents being possible. Excepting when expressly specified in particular claims, I do not limit myself to oil of long leaf variety of pine, nor to the more particular specific gravities mentioned nor to the oil obtained by the resin bath process.

I prefer to apply the heat in the process of devulcanizing by passing the current of steam of about 100 lbs. pressure through the closed devulcanized oven so that said steam circulates not only in contact with the cover over the mass being treated but also in contact with the sides and bottom of the metal tank containing the mass and thereby applies the heat to the mass from every direction. The cover of the devulcanizing tank that I prefer to employ is a loose cover not necessarily excluding the steam.

What I claim as new and desire to secure by Letters Patent is:

1. The process of devulcanizing rubber which consists in subjecting the same to a bath containing oil of between .88 and .96 specific gravity distilled from pine wood.

2. The process of devulcanizing rubber which consists in subjecting the same to a bath containing oil of between .88 and .96 specific gravity distilled from long leaf pine wood.

3. The process of devulcanizing rubber which consists in subjecting the same to a bath containing oil of between .88 and .96 specific gravity distilled from pine wood in a bath of liquid having a boiling point above 200° C.

4. The process of devulcanizing rubber which consists in subjecting the same to a bath containing oil of about from .93 to .95 specific gravity obtained by distilling pine wood.

5. The process of devulcanizing rubber which consists in subjecting the same to a bath containing oil of about from .93 to .95 specific gravity obtained by distilling long leaf pine wood.

6. The process of devulcanizing rubber which consists in subjecting the same to a bath containing oil of about from .93 to .95 specific gravity obtained by distilling pine wood in a bath of liquid volatilizing at above 200° C.

7. The process of devulcanizing rubber which consists in subjecting the same to heat and pressure in a bath containing water and oil of between .88 and .96 specific gravity distilled from pine wood.

8. The process of devulcanizing and defiberizing rubber which consists in subjecting the same to a bath containing water and a fiber destroying agent and oil of between .88 and .96 specific gravity distilled from pine wood.

9. The process of devulcanizing and defiberizing rubber which consists in subjecting the same to a bath containing a fiber destroying agent and an oil of between .88 and .96 specific gravity obtained from pine wood.

10. The process of devulcanizing and defiberizing rubber which consists in subjecting the same to a bath containing a defiberizing agent and an oil of about .93 to .96 specific gravity obtained from pine wood.

11. As a new article of manufacture, the product which may be obtained by devulcanizing rubber in a bath containing oil of about from .93 to .96 specific gravity distilled from pine wood.

12. The process of devulcanizing rubber which consists in subjecting the same to heat and pressure in a bath containing oil obtained from pine wood which oil in a dry still will, in greater part, distil over at a temperature between about 200 and 220° C.

13. The process of devulcanizing rubber which consists in subjecting the same to heat and pressure in a bath containing oil obtained from pine wood which oil in a dry still will, in greater part, distil over at a temperature between about 200 and 220° C. and having a specific gravity between .90 and .96 at 15° C.

14. The process of devulcanizing rubber which consists in subjecting the same to a bath containing pine oil obtained from pine wood.

15. The process of devulcanizing rubber which consists in subjecting the same to a bath containing oil obtained from pine wood and having a specific gravity between that of turpentine and resin oil.

16. The process of devulcanizing rubber which consists in subjecting the same to a bath containing oil obtained from pine wood and having a boiling point between approximately 200° and 220° C.

17. The process of devulcanizing and defiberizing rubber which consists in subjecting the same to a bath containing a fiber destroying agent and pine oil.

18. As a new article of manufacture the product which may be obtained by devulcanizing rubber in a bath containing pine oil obtained from pine wood 19. The process of devulcanizing rubber which consists in subjecting the same to heat and pressure in a bath containing water and pine oil obtained from pine wood.

In testimony whereof, I have hereunto signed my name in the presence of two subscribing witnesses.

SAMUEL E. ALLEN.

Witnesses:
JAY E. TAYLOR,
GEORGE E. GILMORE.